(12) United States Patent
Guerra

(10) Patent No.: US 11,938,857 B2
(45) Date of Patent: Mar. 26, 2024

(54) REUSABLE STRETCHING TIE-DOWN WITH LOCKING LINKS

(71) Applicant: Zacarias Guerra, Edinburg, TX (US)

(72) Inventor: Zacarias Guerra, Edinburg, TX (US)

(*) Notice: Subject to any disclaimer, the term of this patent is extended or adjusted under 35 U.S.C. 154(b) by 248 days.

(21) Appl. No.: 17/527,183

(22) Filed: Nov. 16, 2021

(65) Prior Publication Data
US 2022/0161707 A1    May 26, 2022

Related U.S. Application Data

(60) Provisional application No. 63/116,305, filed on Nov. 20, 2020.

(51) Int. Cl.
*B60P 7/08* (2006.01)

(52) U.S. Cl.
CPC .................... *B60P 7/0823* (2013.01)

(58) Field of Classification Search
CPC .......... B60P 7/0823; F16L 3/14; F16L 3/233; B65D 77/18; B65D 63/1018
USPC ............................................ 248/499; 24/301
See application file for complete search history.

(56) References Cited

U.S. PATENT DOCUMENTS

| | | | |
|---|---|---|---|
| 1,086,442 A * | 2/1914 | Cornelius ................. | F16L 3/14 248/909 |
| 1,945,932 A * | 2/1934 | Caley ....................... | A45D 2/18 24/17 AP |
| 2,601,083 A * | 6/1952 | Brouse ...................... | F16C 1/10 24/129 B |
| 2,912,213 A * | 11/1959 | Krystosek ................. | F16B 2/02 410/96 |
| 3,224,054 A * | 12/1965 | Lige ......................... | F16L 3/233 248/74.3 |
| 3,438,095 A * | 4/1969 | Evans ..................... | B65D 63/10 24/16 PB |
| 3,588,962 A | 6/1971 | Feldberg | |
| 3,761,999 A * | 10/1973 | Morgan ............. | B65D 63/1072 24/16 PB |
| 3,913,178 A * | 10/1975 | Ballin ................ | B65D 63/1018 24/30.5 R |
| 4,045,843 A * | 9/1977 | Loose ................ | B65D 63/1018 24/16 PB |
| 4,466,159 A * | 8/1984 | Burrage ................ | B65D 77/18 24/17 AP |
| 4,580,319 A * | 4/1986 | Paradis .................... | F16L 3/233 24/17 AP |
| 5,799,376 A * | 9/1998 | Harsley ................. | B65D 63/10 24/17 AP |
| 5,987,706 A * | 11/1999 | Boe ..................... | B65D 63/1018 24/442 |
| 6,185,792 B1 | 2/2001 | Nelson et al. | |
| 6,807,715 B1 * | 10/2004 | Blair .................. | B65D 63/1027 24/17 A |
| D615,385 S | 5/2010 | Arendt | |
| 7,805,816 B1 | 10/2010 | Thorne, III et al. | |
| D631,731 S | 2/2011 | Chen | |

(Continued)

*Primary Examiner* — Monica E Millner

(57) ABSTRACT

A Reusable Stretching Tie-Down With Locking Links that is made up of two ends (tabs) and a plurality of links and joints between the ends. The two ends are composed of a beveled, wedged tip connected to a flat plane. The two ends are joined together by an alternating chain of links and joints. The Tie-Down can be used to secure objects in many applications, such as cargo in transportation systems, farming/gardening equipment, camping equipment, etc.

7 Claims, 7 Drawing Sheets

(56) References Cited

U.S. PATENT DOCUMENTS

| | | | |
|---|---|---|---|
| 8,955,201 B2 | 2/2015 | Bogoslofski et al. | |
| 9,151,358 B2 | 10/2015 | Dahl et al. | |
| 9,340,340 B2* | 5/2016 | Beckman | B65D 63/1018 |
| 9,528,655 B1 | 12/2016 | Miles | |
| 9,643,763 B2 | 5/2017 | Kierstead | |
| 10,472,147 B2* | 11/2019 | Beckman | B65D 63/1018 |
| 10,604,892 B1* | 3/2020 | Caliri | D07B 1/148 |
| 10,610,217 B2 | 4/2020 | Stone et al. | |
| 11,745,923 B2* | 9/2023 | Wollin | B65D 63/1018 |
| | | | 24/16 PB |
| 2003/0182766 A1* | 10/2003 | Avinger | B65D 63/1027 |
| | | | 24/16 PB |
| 2008/0276432 A1* | 11/2008 | McNeill | B65D 63/1027 |
| | | | 24/16 PB |
| 2011/0271491 A1* | 11/2011 | Clawson | B65D 63/1018 |
| | | | 24/16 PB |
| 2012/0168473 A1* | 7/2012 | Arajakis | A45F 5/02 |
| | | | 224/250 |
| 2014/0020229 A1* | 1/2014 | Moore | F16L 3/233 |
| | | | 24/270 |
| 2014/0283340 A1* | 9/2014 | Beckman | B65D 63/1018 |
| | | | 24/16 PB |
| 2016/0332791 A1* | 11/2016 | Beckman | B65D 63/1018 |
| 2020/0216241 A1* | 7/2020 | Hong | B65D 63/02 |
| 2022/0144511 A1* | 5/2022 | Wollin | H02G 3/32 |

\* cited by examiner (BOUND OBJECTS)

(BOUND & SEPARATED OBJECTS)

(BOUND & SEPARATED OBJECTS)

REUSABLE STRETCHING TIE-DOWN WITH LOCKING LINKS

REFERENCE TO RELATED APPLICATIONS

This application claims an invention which was disclosed in Provisional Application No. 63/116,305, filed Nov. 20, 2020, entitled "Reusable Stretching Tie-Down With Locking Links". The benefit under 35 USC § 119(e) of the United States provisional application is hereby claimed, and the aforementioned application is hereby incorporated herein by reference.

BACKGROUND OF THE INVENTION

There is a massive market for tie-down straps and zip ties, but not much innovation or variety. On one end of the spectrum, you have the classic bungee cord, typically found in an EPDM band with metal hooks on either end. On the other end, the more colorful version—the bundle of elastic strings bound with bright nylon thread, also found with metal hooks on either end. These can be found in nearly every household in all parts of the world and are affordable and easy to find. However, they may lack the strength to secure heavier objects, and the operation of the tool offers limited usage. What many consider the next step up is often found in the same space: crank-down straps. These come in a variety of weights to meet the needs of whatever situation the user may find themselves in. The main drawback to this method is the operational knowledge required to utilize one of these straps. Frankly, many individuals lack the know-how to successfully and safely strap down an object with this method. Research has shown that many individuals opt to misuse this method to haphazardly tie an object down, or simply decide to not secure the object at all, both resulting in a safety concern for the operator of the strap and those around them. Lastly, you could always use the tried-and-true nylon rope. This option is affordable and comes in unique lengths to meet your needs. But like the crank-down straps, it also requires a bit of knowledge to use correctly. A rope is only efficient and useful if the operator carries the proper knowledge of knots and bindings necessary for the task at hand. If not properly used, a rope can easily untie and become useless. There is a chasm between these three methods, leaving a need for a new alternative to emerge. An alternative that offers the affordability and ease of use of a bungee cord, while also providing the higher stability and strength found in the crank-down straps, would fill this need. This strap aims to play to the strengths of all the options currently available on the market while eliminating the guess work and stumbling blocks that cause users to opt out of using these currently available options altogether.

FIELD OF THE INVENTION

The present invention relates to a method and apparatus for restraining cargo or any other type of items that need to transported on a truck, a railroad flat car or in an aircraft. Or items that need to restrained with a single strap.

DESCRIPTION OF RELATED ART

Unless expressly identified as being publicly or well known, mention in the present disclosure of techniques and concepts, including for context, definitions, or comparison purposes, should not be construed as an admission that such techniques and concepts are previously publicly known or otherwise part of the prior art. References cited in the present disclosure (if any), including patents, patent applications, and publications, are hereby incorporated by reference in their entireties, whether specifically incorporated or not, for all purposes.

SUMMARY OF THE INVENTION

Exemplary aspects of the invention relate to a Reusable Stretching Tie-Down With Locking Links, that is made up of two ends and a plurality of links and joints between the ends. The two ends are composed of a beveled, wedged tip connected to a flat plane, roughly the same thickness and width as the terminals within the links. Either side of the plane features a curved indentation for gripping and pulling. The ends and all of its components will be referred to as the "tab". The two tabs are joined together by an alternating chain of links and reinforced joints. Immediately connected to the opposing tabs are the first reinforced joints. The tie down can be used for securing objects such as cargo or loose objects, the tie-down can be wrapped around the objects, the tab is inserted through the terminal closest in proximity to the size of objects and drawn through until appropriately tightened. The tie-down is placed in a locked position when the joint is turned in the terminal, securing the objects. Tie-downs can vary in size both in length and dimensions, in order to secure anything from large cargo such as water pipes to camping equipment or any object.

Figure 7:
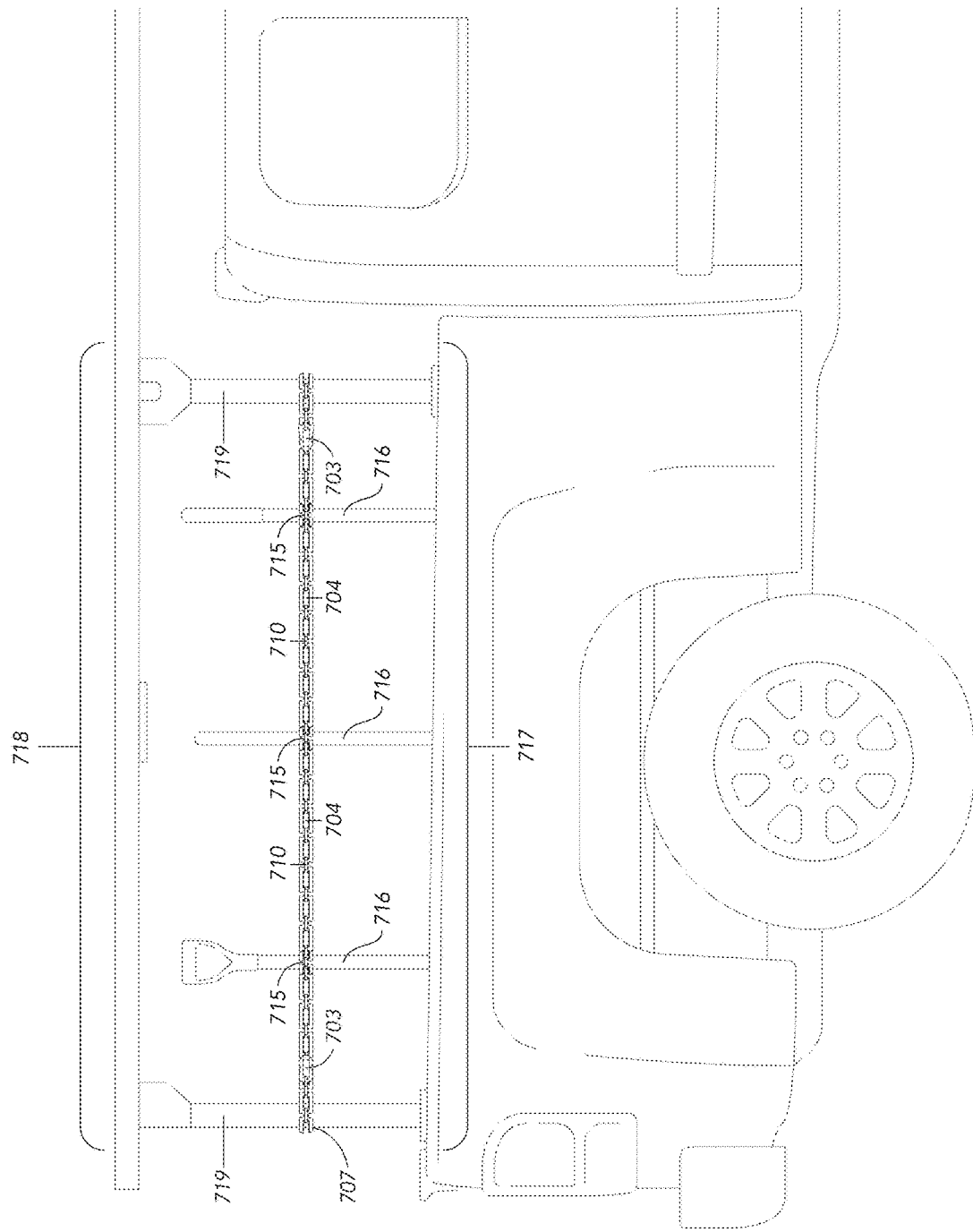

FIG. 7 illustrates a plurality of loose objects, separated, and stabilized in the bed of a pick up truck. 703 tab, 707 link, 715 looped section, 716 implement.

DETAILED DESCRIPTION OF THE INVENTION

A detailed description of one or more embodiments of the invention is provided below along with accompanying figures illustrating selected details of the invention. The invention is described in connection with the embodiments. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1A:
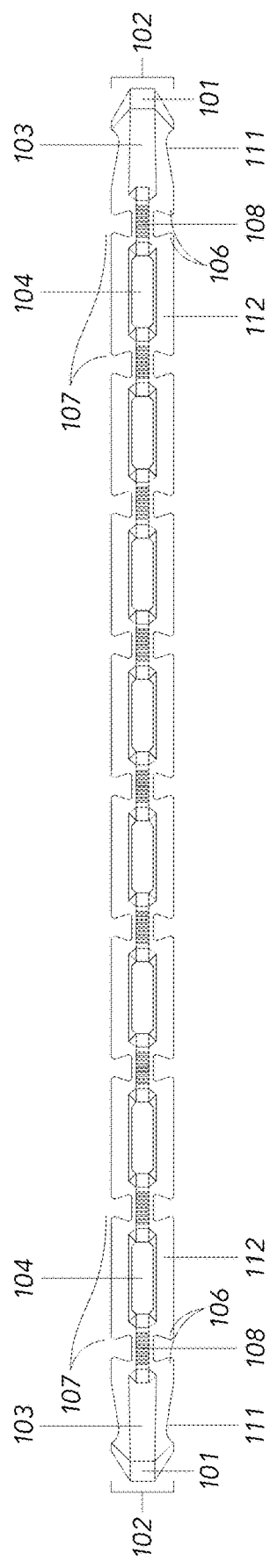
FIG. 1A illustrates an aerial view of the tie-down and its parts depicted at full length. 101 nose wedge, 102 nose, 103 tab, 104 terminal, 105 locking channel, 106 angle nocks, 107 link, 108 rippled grip ridge, 109 joint wedge, 110 joint, 111 indented thumb grip, 112 beveled side.
Figure 1B:
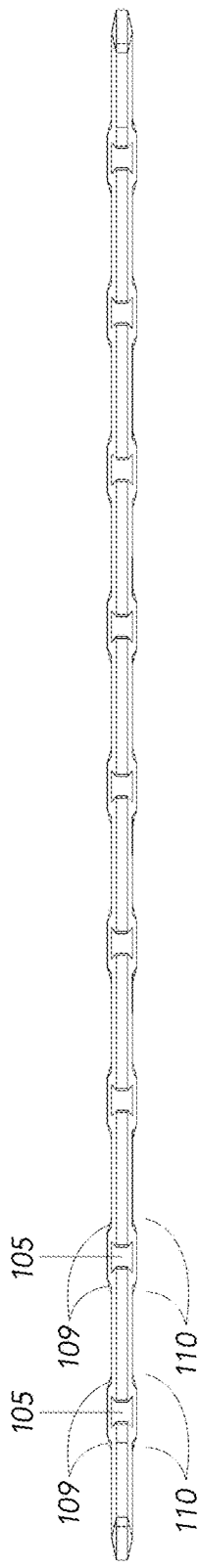
FIG. 1B illustrates a profile view of the tie-down and its parts depicted at full length. 101 nose wedge, 102 nose, 103 tab, 104 terminal, 105 locking channel, 106 angle nocks, 107 link, 108 rippled grip ridge, 109 joint wedge, 110 joint, 111 indented thumb grip, 112 beveled side.

Referring initially to FIG. 1(*a*)-(*b*) of the drawings, an illustrative embodiment of the present invention a Reusable Stretching Tie-Down With Locking Links, hereinafter referred to as the "tie-down", made up of two nose ends 102 and a plurality of links 107 and joints 110 (reinforced joints) between the nose ends 102. All joints in all figures are reinforced joints but will be referred to as "joints". The two nose ends 102 are composed of a beveled, wedged tip 101 connected to a flat plane, roughly the same thickness and width as the terminals 104 within the links 107. Either side of the plane features a curved indentation 111 for gripping and pulling. The ends and all of its components (101, 102, 111) will be referred to as the "tab" 103. The two tabs 103 are joined together by an alternating chain of links 107 and joints 110.

Each joint 110 is of equal width to the terminal 104 width of every link 107. All joints 110, for durability and strength, are given increased thickness (reinforcement) on top and bottom so that each joint 110 is at least 1.5× thicker than each link 107. To minimize the resistance in passing reinforced joints 107 through the smaller links 107, the joints 110 are beveled at a 45-degree angle (or at any degree between 10-80 degrees) on either side of the joint 110, creating a parallelogram—each angle sloping down toward the terminal 104 of the next link 107. Each joint 110 is embossed with a plurality of grooves cut into the top and bottom of each joint creating superficial cuts. These cuts make up the rippled grip ridge of each joint and create a subtle texture to allow for better traction when gripping the joint, while minimally affecting the resistance of the joints 107 through each terminal 104. Each joint 110 within the chain is followed by a link 107. Links 107 are elongated and are equal to the tabs 103 in width and thickness. Every link has beveled sides 112 which slope down and away from the terminal 104 to minimize thickness to allow for less resistance when passing through the terminals 104, which are nearly identical in width and thickness at their widest and thickest points. Removed from the center of each link 107 is a hollow section called a terminal 104. The terminal 104 is sized and placed in a way that all four edges of each link 107 are equal in width. The four corners of the link 104 are flared outward toward the joint 110 and away from the link's 107 terminal 104, so that the resulting shape is reminiscent of a stretched-out hourglass. The resulting angles 106 (angle nocks), paired with the following joint 110 and opposing angles of the sequential link 104, help form a "locking channel" 105 that tapers and helps reduce movement and friction when the strap is in a locked position within this channel. This pattern of joint-link-joint repeats until there are a total of 10 joints and 9 links along the chain. Number of joints and links may vary with model size and usage. Depending on usage, straps may vary in size, thickness and flexibility, with the smaller variants being less thick and more flexible. The longer and wider the strap, the more rigid the joints and links will be.

Figure 2:
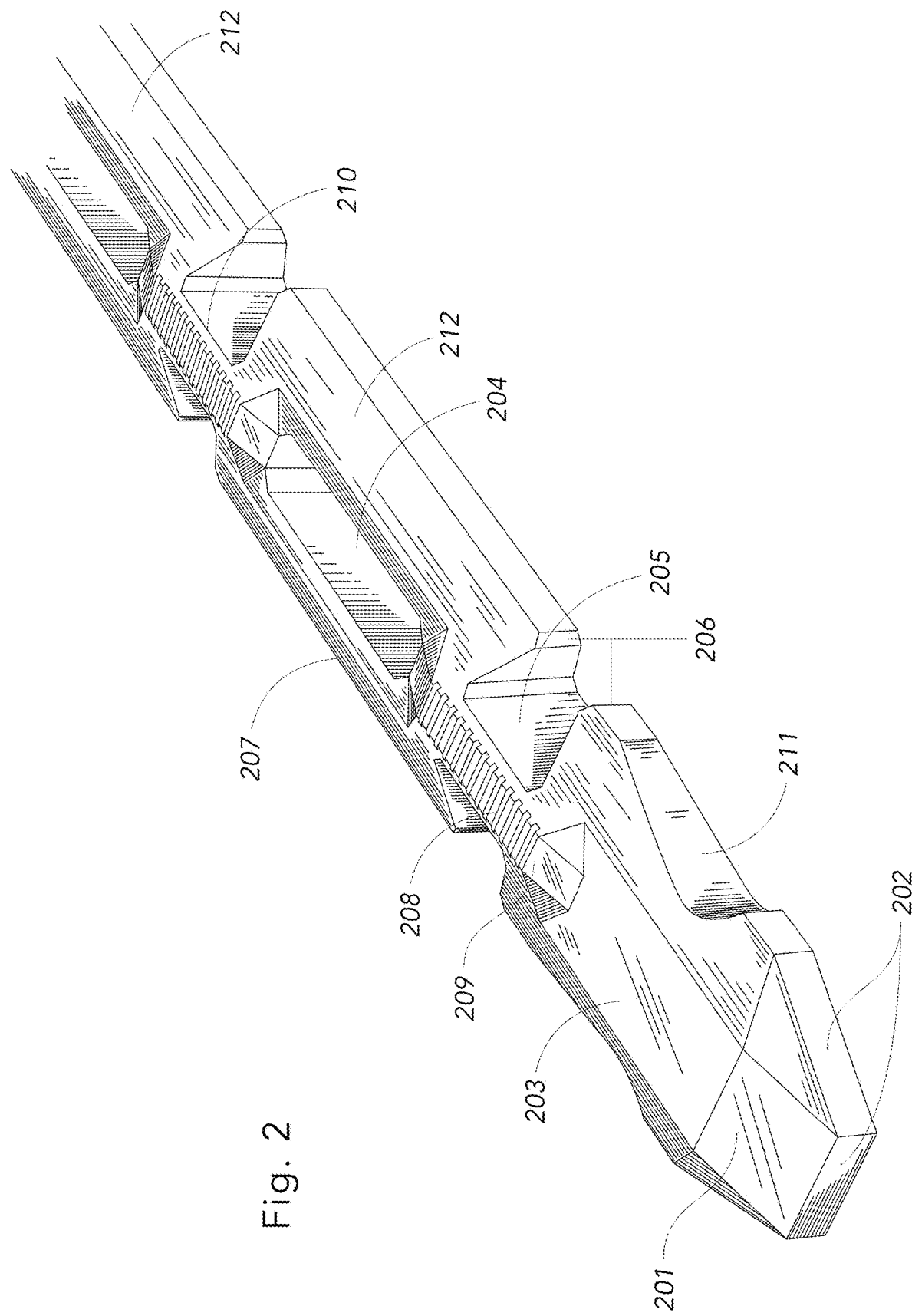
FIG. 2 illustrates an abbreviated three-quarter view of one end of the tie-down depicting a tab, joint, link, and all of their components therein. 201 nose wedge, 202 nose, 203 tab, 204 terminal, 205 locking channel, 206 angle nocks, 207 link, 208 rippled grip ridge, 209 joint wedge, 210 joint, 211 indented thumb grip, 212 beveled sides.

Referring to FIG. 2 of the drawings, an illustrative embodiment of the view of one end of the tie-down depicting the tab 203 composed of a nose 202 with beveled nose wedged 201 tip flanked by beveled sides, an indented thumb grip 211, a joint wedge 209. The tab 203 is connected to the link 207 by a locking channel 205 with a rippled grip ridge 208. Both the end of the tab 203 and link 207 have angle nocks 206. The link 207 is composed of a terminal 204 and beveled sides 212. (is 205 the same as 210?)

Figure 3:
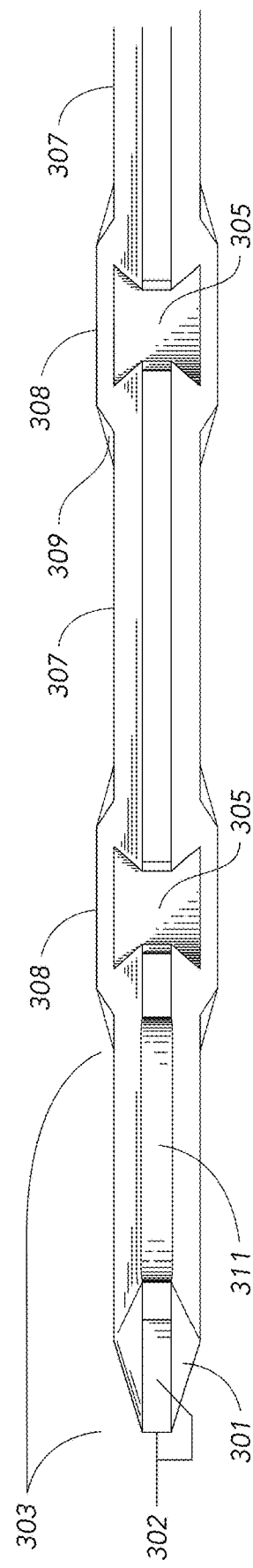
FIG. 3 illustrates an abbreviated profile view of one end of the tie-down depicting a tab, joint, link, and all of their components therein. 301 nose wedge, 302 nose, 303 tab, 305 locking channel, 307 link, 308 rippled grip ridge, 309 joint wedge, 311 indented thumb grip.

Referring to FIG. 3 of the drawings, an illustrative embodiment of a profile view of one end of the tie-down depicting the tab 303 composed of a nose 302 with beveled nose wedged 301, an indented thumb grip 311, a joint wedge 309. The tab 303 is connected to the link 307 by a locking channel 305 with a rippled grip ridge 308.

Figure 4:
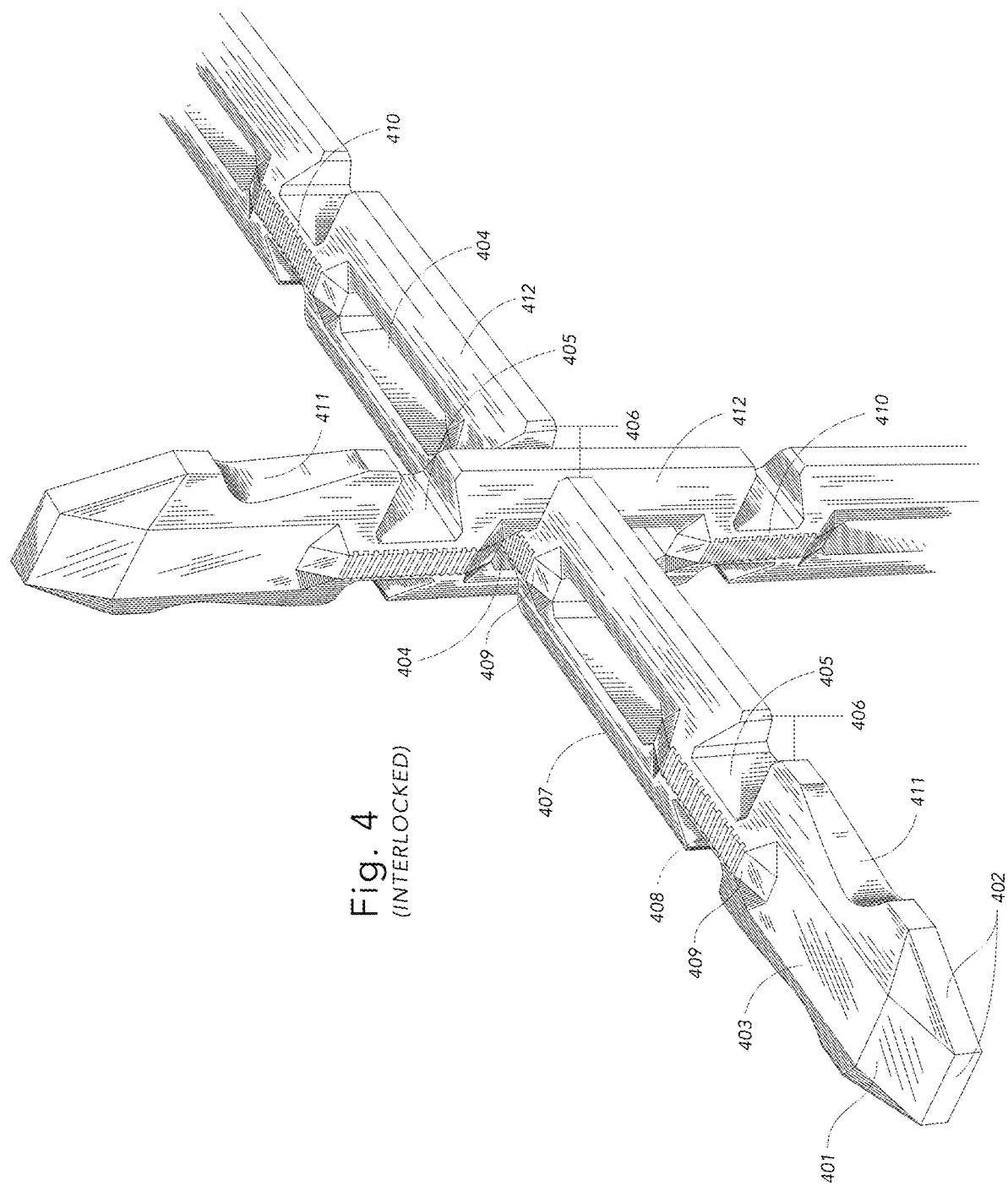
FIG. 4 illustrates three-quarter view depicting the way and manner in which the joint and link interlock with one another with the joint being tightly secured within the terminal. 401 nose wedge, 402 nose, 403 tab, 404 terminal, 405 locking channel, 406 angle nocks, 407 link, 408 rippled grip ridge, 409 joint wedge, 410 joint, 411 indented thumb grip, 412 beveled sides.

Referring to FIG. 4 of the drawings, an illustrative embodiment of a view depicting the joint 410 and link 407 interlocking with one another, with the joint 410 being tightly secured within the terminal 404. The angle nocks 406 perpendicular to the beveled sides 412 of the link 407.

Figure 5:
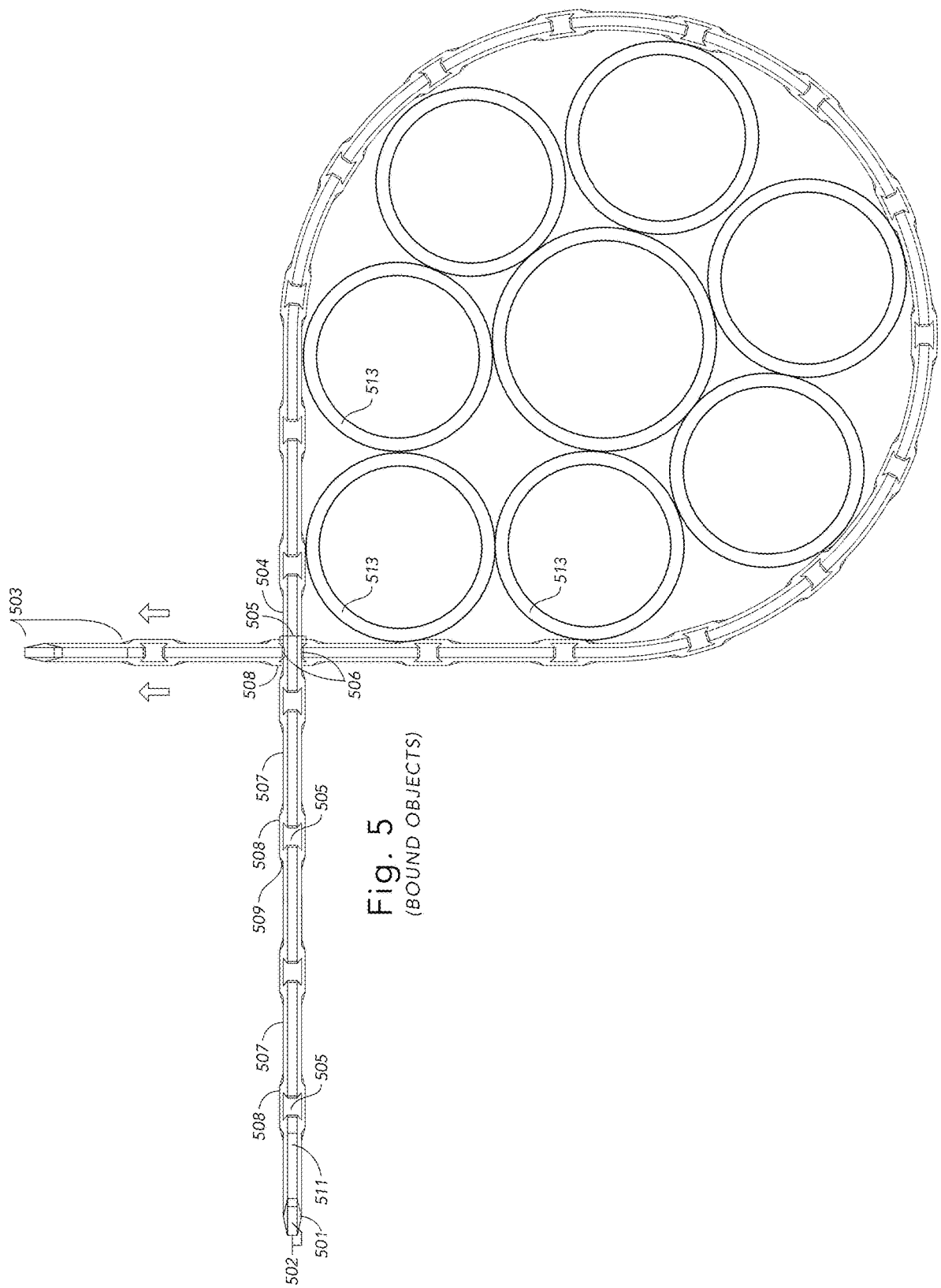
FIG. 5 illustrates a profile view of the tie-down and its usage as a means of securing and binding a multitude of loose objects. 501 nose wedge, 502 nose, 503 tab, 505 locking channel, 507 link, 508 rippled grip ridge, 509 joint wedge, 511 indented thumb grip, 513 cylindrical object.

Referring to FIG. 5 of the drawings, an illustrative embodiment view of the tie-down and its usage in securing and binding a plurality of cylindrical objects 513. The tie-down is wrapped around the plurality of cylindrical objects 513, the tab 503 is inserted through the terminal 504 closest in proximity to the cylindrical objects 513 and drawn through until appropriately tightened. The tie-down is in locked position with the joint 508 turned in the terminal 504, and the angled nocks 506 framing the beveled sides of the link 507.

Figure 6:
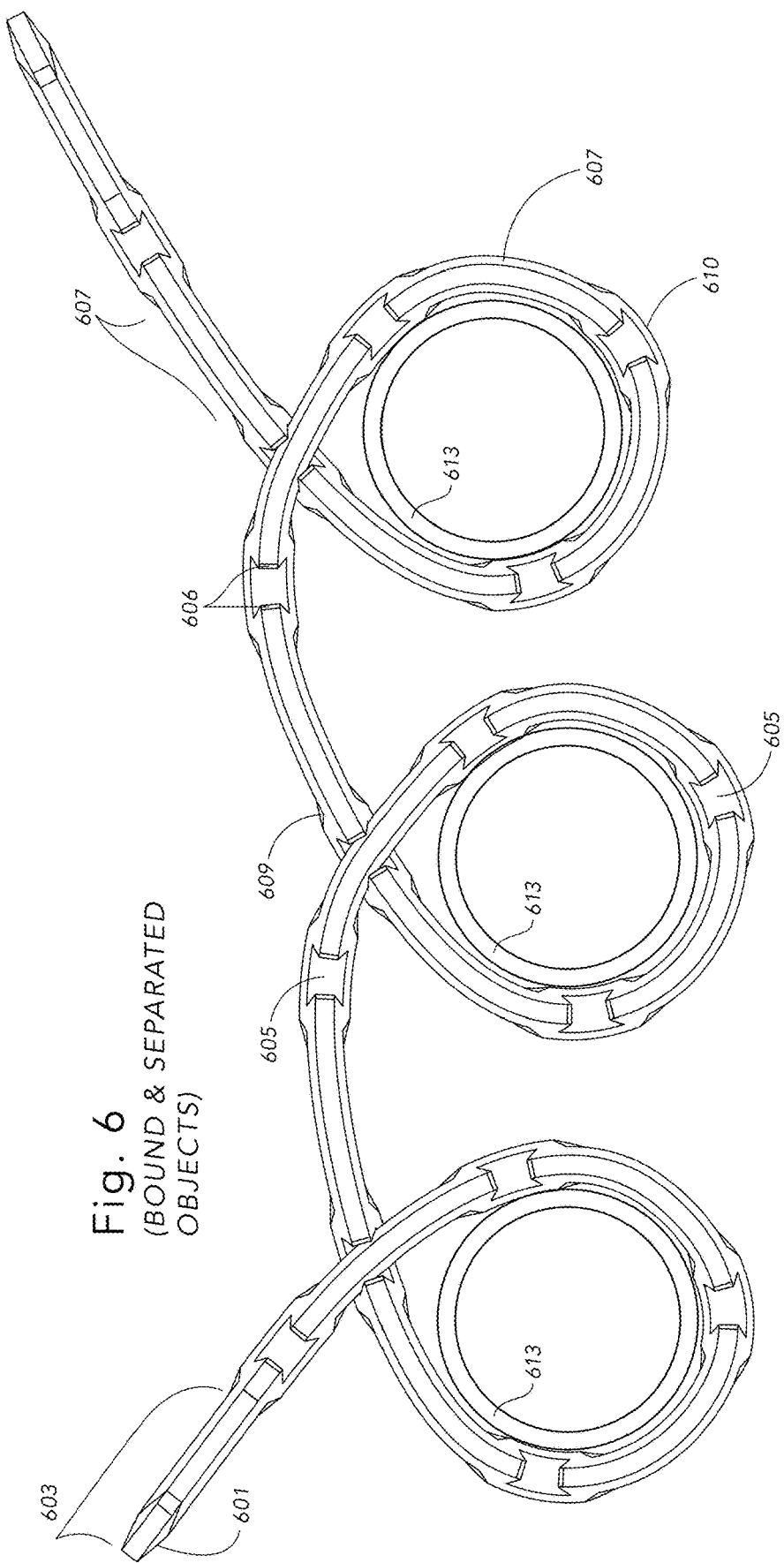
FIG. 6 illustrates a profile view of the tie-down and its usage as a means of securing, binding, and separating a multitude of loose objects. 601 nose wedge, 603 tab, 605 locking channel, 606 angle nocks, 607 link, 609 joint wedge, 610 joint, 613 cylindrical object.

Referring to FIG. 6 of the drawings, an illustrative embodiment view of the tie-down as used in securing, binding, and separating a multitude of loose objects 613. The tie-down is wrapped around the plurality of cylindrical objects 613 by creating several loops within itself utilizing the method and action of FIG. 5.

Referring to FIG. 7 of the drawings, an illustrative embodiment view of a pickup truck utilizing the method of securing, binding, and separating a multitude of loose objects 716 as shown in FIG. 6. A series of links 707 wrapped around a support 719 and locked with the tab 703 in the same manner and fashion depicted in FIG. 4. Each object 716 is secured by means of a "looped section" 715 in the same manner and fashion depicted in FIG. 6.

In the following embodiment, one or more loose objects can be secured and stabilized. For this example, the object to be secured is located in the bed of a pickup truck. The object is maneuvered to any wall of the truck bed and positioned directly next to any of the vehicle's four corner D-rings, or centered between any two rings. In the case that the object is positioned directly next to a single D-ring, the tie-down can operate in one of two ways. First, the tie-down can slide through the D-ring, led by the tab of the tie-down. After three to four links have passed through the opening of the D-ring, the tab can then be looped back over the ring, creating an open loop. To close the loop and create a lock, the tab can be slid through the terminal of any link closest to the D-ring and twisted to lock in place (as shown in FIG. 4). The angled nocks should be hugging the chamfer of the link, and both sides of the link should fit evenly within the locking channel. If the loose object has a handle or sturdy frame, the free end and tab of the tie-down can be wrapped around the handle or frame and secured in the same manner as the other side around the D-ring. In the case that there is not a handle or heavy frame to latch on to, the tie-down can wrap around the object's circumference, with the free end secured around the same D-ring. Or, the free tab can simply be run through a terminal on the opposite end of the free tab and twisted back to lock and secure.

Another embodiment for securing a plurality of loose objects, separated and stabilized in the bed of a pickup truck, as seen in FIG. 7. For this example, the objects 716 to be secured and separated are located along the length of the truck bed 717, between the legs of a stake pocket truck rack 718. The objects 716 to be secured and separated are lawn and garden implements (e.g., shovels, rakes, weed eaters, etc.). To secure the tie-down, select a support 719 on either side of the truck bed. Wrap the tie-down around the support 719, with the tab 703 in one hand and the remaining length of the tie-down in the opposite hand. After creating an open loop with the tie-down, close the loop 715 and create a lock by turning and sliding the tab through the terminal 704 of any link through which the smallest and tightest loop would be created. The size of the loop 715 will vary depending on the size and circumference of the support or frame. After securing the tie-down to the support 719, take each garden implement and space them evenly against the wall of the truck bed and along the length of the tie-down. To secure the first implement, take the loose length of the tie-down and wrap it around the shaft of the implement, creating a U-shaped open circle 715 with the shaft in the belly of the "U" and the free tab moving back in the direction of the secured end around the first leg. Take the loose tab 703 and pass it through the terminal 704 on the opposite side of the implement and closest to the shaft. Slide the tab 703 and a plurality of links 707 and joints 710 through the terminal 704 until the tie-down forms a tight loop 715 around the shaft and there are no additional links 707 and joints 710 to pass through the terminal 704. Repeat the process of creating loops around the shafts of the remaining implements along the side of the truck bed, taking care to leave an appropriate amount of links 707 and joints 710 to create a loop, and lock around the opposite support 719 of the stake pocket truck rack 718.

While most of the exemplary examples show the Reusable Stretching Tie-Down With Locking Links, with tabs on both ends, some implementations could use only a single tab on one end of the Reusable Stretching Tie-Down With Locking Links. As well as the number of links can be implementation specific, depending the length of the Reusable Stretching Tie-Down With Locking Links.

The joint wedge shown in in FIG. 1-6 (109, 209, 309, 409, 509, 609) is necessary because the link's terminal is not the same width as the thickness of the reinforced joints. The terminal is quite a bit smaller. The wedge shape forces the terminal to gradually open to allow the joint to slide through.

Illustrative examples for the use of the Reusable Stretching Tie-Down With Locking Links include a tie-down apparatus used to brace and secure objects placed on a vehicle rooftop rack when traveling. A tie-down apparatus used by movers to secure cargo for transport in a moving truck. An interlocking strap used by movers to wrap around and restrict boxes from opening while being transported. An interlocking strap used by property owners to secure and hold swinging gates closed. An interlocking strap used by hikers to bind and attach supplies to a pack. A foldable, interlocking, strap used by campers to secure tarps to support structures (e.g. trees, poles). An interlocking strap used to bind, organize, and separate various supplies (e.g. tent, rain fly, poles). An interlocking strap used by fishermen to bind and organize netting and equipment. An interlocking strap used by boaters to secure boat to dock cleat. Tie-downs capable of combining together to create a grid mesh to secure larger, flat-surfaced objects. Tie-downs capable of combining together to increase length to sufficiently wrap around the circumference of an object to be secured. A tie-down apparatus capable of creating loops within itself. An interlocking, constricting, strap used by first responders to limit—but not stop—the flow of blood and act as a tourniquet.

Exemplary implementations have been described hereinabove regarding the Reusable Stretching Tie-Down With Locking Links. While specific, exemplary embodiments have been shown and described, various modifications to and/or departures from the disclosed embodiments will occur to those having skill in the art. For example, a Reusable Stretching Tie-Down With Locking Links with only one tab on one end. One of ordinary skill in the art will also appreciate that the elements and features described and illustrated in the figures herein can be optionally included to achieve the benefits of the presently disclosed Reusable Stretching Tie-Down With Locking Links. Additionally, those skilled in the art will appreciate that features in each of the figures described herein can be combined with one another and arranged to achieve the described benefits of the presently disclosed Reusable Stretching Tie-Down With Locking Links. Various modifications to and departures from the disclosed implementations will occur to those having skill in the art.

The invention claimed is:

1. A reusable stretching tie-down comprising:
    a plurality of connected links;
    an integrally formed tab on at least one end;
    wherein the links are connected to one another and to the tab with a locking channel and a joint;
    wherein the tab has a nose wedge, an angle nocks, an indented thumb grip between the nose wedge and the angle nocks, and a joint wedge adjacent to the locking channel;
    wherein each of the links has angle nocks at each end, a joint wedge adjacent to the locking channels at each end, and a terminal, the terminal being an opening between the joint wedges of each link; and
    wherein the reusable stretching tie-down is enabled to be adjusted to a desired length and secured by inserting the tab into the terminal of a particular one of the links, pulling at least the tab and optionally one or more of links behind the tab through the terminal of the particular link, and rotating a last one of the tab or the links behind the tab to be pulled through the terminal of the particular link at the locking channel of the last one of the tab or the one or more links behind the tab to be pulled through the terminal of the particular link to lock the reusable stretching tie-down at the desired length.

2. The reusable stretching tie-down of claim 1, wherein each link has beveled sides to match the angle of the angle nocks on the tab and the links.

3. The reusable stretching tie-down of claim 1, wherein the tab is composed of a beveled nose wedged tip connected to a flat plane, approximately the same thickness and width as the terminals of the links.

4. The reusable stretching tie-down of claim 1, wherein the joint wedges of the tab and each link minimize the resistance in passing the joint through the link, the joint wedges are beveled at a 45 degree angle, creating a parallelogram, each angle sloping down toward the terminal.

5. The reusable stretching tie-down of claim 1, wherein the joint has a rippled grip ridge to connect the tab or the links behind the tab to be pulled through the terminal of a link.

6. The reusable stretching tie-down of claim 1, where in the tab and links have congruent top and bottoms.

7. The reusable stretching tie-down of claim 1,
wherein the tab is a first tab at one end of the reusable stretching tie-down, and
further comprising a second tab at the other end of the reusable stretching tie-down.

* * * * *